(12) United States Patent
Cross et al.

(10) Patent No.: US 8,489,696 B2
(45) Date of Patent: Jul. 16, 2013

(54) INSTANT MESSAGING EXCHANGE INCORPORATING USER-GENERATED MULTIMEDIA CONTENT

(75) Inventors: Tiffany B. Cross, Austin, TX (US); Lisa Seacat DeLuca, San Francisco, CA (US); Frank Lawrence Jania, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 12/568,860

(22) Filed: Sep. 29, 2009

(65) Prior Publication Data

US 2011/0078251 A1    Mar. 31, 2011

(51) Int. Cl.
G06F 15/16    (2006.01)
(52) U.S. Cl.
USPC ............................. 709/207; 709/206; 709/231
(58) Field of Classification Search
USPC .......................................... 709/206, 207, 231
See application file for complete search history.

(56) References Cited

U.S. PATENT DOCUMENTS

| | | | |
|---|---|---|---|
| 2005/0144247 A1* | 6/2005 | Christensen et al. | 709/207 |
| 2005/0204309 A1* | 9/2005 | Szeto | 715/811 |
| 2007/0036292 A1* | 2/2007 | Selbie et al. | 379/88.14 |
| 2008/0228890 A1* | 9/2008 | George et al. | 709/206 |

OTHER PUBLICATIONS

Scott Gilbertson; Watch Inline Video with the New Yahoo Messenger; http://www.webmonkey.com/blog/Watch_Inline_Video_With_The_New_Yahoo_Messenger; Oct. 30, 2007.

* cited by examiner

Primary Examiner — Liangche A Wang
Assistant Examiner — Cheikh Ndiaye
(74) Attorney, Agent, or Firm — Steven L. Nichols; Van Cott, Bagley, Cornwall & McCarthy P.C.

(57) ABSTRACT

A method for displaying multimedia content created by a user of a first computerized messaging device to a user of a second computerized messaging device communicatively coupled to the first computerized messaging device by a network includes: displaying, with the second computerized messaging device, a textual instant messaging exchange between the user of the first computerized messaging device and the user of the second computerized messaging device; receiving the multimedia content at the second computerized messaging device over the network; and dynamically embedding a player for the multimedia content in-line in the display of the textual instant messaging exchange at the second messaging device.

17 Claims, 5 Drawing Sheets

INSTANT MESSAGING EXCHANGE INCORPORATING USER-GENERATED MULTIMEDIA CONTENT

BACKGROUND

The present specification relates to the field of instant messaging exchanges. Specifically, the present specification relates to the field of user-generated multimedia content in instant messaging exchanges.

Instant messaging allows parties to communicate remotely with each other via computers, mobile devices, or other electronic devices capable of such exchanges. Instant messaging is a type of real-time communication between two or more people that is generally based on typed text. The text may be conveyed by devices electronically or wirelessly connected over a network, such as the Internet or a cellular phone network.

Instant messaging has become widely used in many different applications and allows people to communicate with each other in a low attention, low commitment, passive exchange, while being able to continue to perform other tasks simultaneously. Some businesses also use instant messaging for quick, textual exchanges that generally produce better responsiveness than email and are less intrusive than phone calls or other remote methods of communication.

BRIEF SUMMARY

A method for displaying multimedia content created by a user of a first computerized messaging device to a user of a second computerized messaging device communicatively coupled to the first computerized messaging device by a network includes: displaying, with the second computerized messaging device, a textual instant messaging exchange between the user of the first computerized messaging device and the user of the second computerized messaging device; receiving the multimedia content at the second computerized messaging device over the network; and dynamically embedding a player for the multimedia content in-line in the display of the textual instant messaging exchange at the second messaging device.

An instant messaging system includes: a computerized messaging device having a processor and memory communicatively coupled to the processor. The computerized messaging device is configured to: exchange textual instant messages with a remote device over a network and display the textual instant messages to a user; receive multimedia content from the remote device, the multimedia content being related to the textual instant message exchange; and dynamically embed a player for the multimedia content in-line in the display of the textual instant messages to the user.

A computer program product for incorporating user-generated multimedia content in an instant message exchange includes a computer readable storage medium having computer readable program code embodied therewith. The computer readable program code includes computer readable program code configured to: exchange textual instant messages with a remote device over a network and display the textual instant messages to a user; receive multimedia content from the remote device, the multimedia content being related to the textual instant message exchange; and dynamically embed a player for the multimedia content in-line in the display of the textual instant messages to the user.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
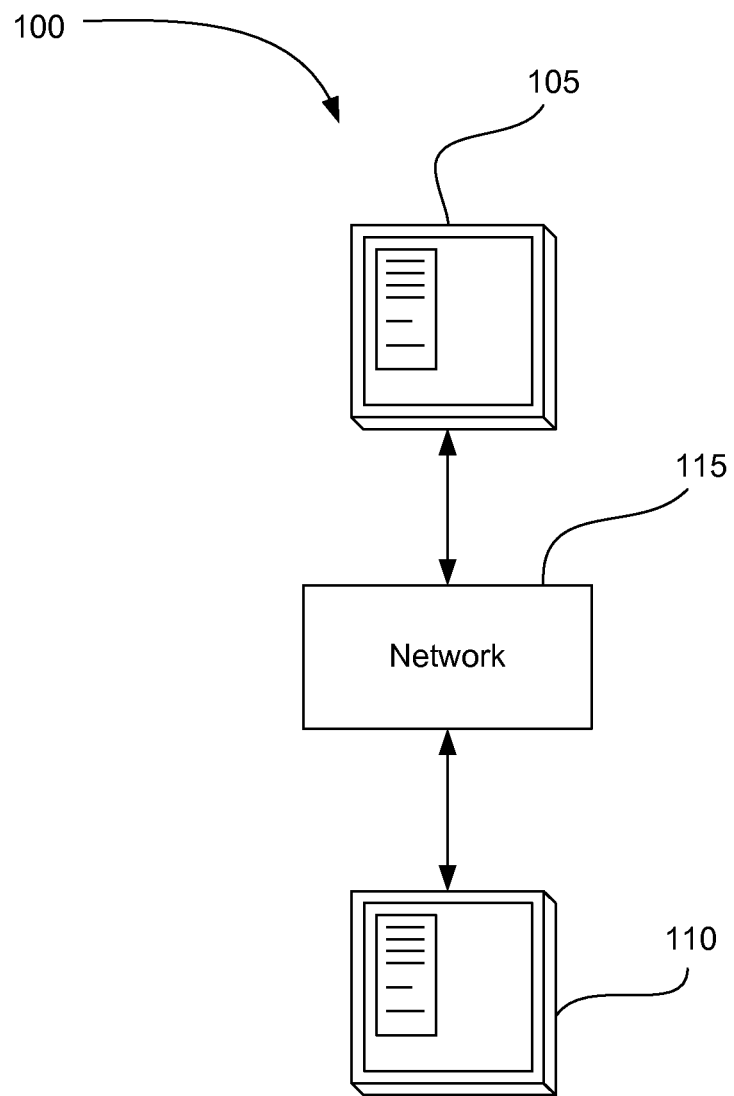
FIG. 1 is a diagram of an illustrative system for an instant messaging exchange, according to one exemplary embodiment of principles described herein.

The present specification discloses a method, system, and computer program product relating to incorporating user-generated multimedia content into an instant messaging exchange. According to the principles described herein, a user may record or otherwise generate multimedia content at a first messaging device to be sent to a second messaging device that has an established instant messaging exchange connection using an instant messaging client. The user-generated multimedia content may be embedded in the instant messaging client in-line with other text in the instant messaging exchange.

As used in the present specification and appended claims, the term "instant messaging exchange," "instant messaging," or "chat" refers to a real-time text-based exchange over a remote connection, such as a wired or wireless network. The instant messaging exchange may take place via an instant messaging client on at least two devices capable of instant messaging, such as a computer, a cellular phone, a personal digital assistant, and others. Specifically, the instant messaging client allows a user to record user-generated multimedia on a first messaging device to be sent to and displayed on a second messaging device.

As used in the present specification and appended claims, the term "user-generated multimedia content" refers to video, audio, or other multimedia content that is recorded or created by the user through either a microphone, camera, or other multimedia capturing device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, an illustrative system (100) capable of and instant messaging exchange is shown. The system includes first and second messaging devices (105, 110) in communication with each other through a network (115). The messaging devices (105, 110) may be any device capable of real-time text-based communication through a remote connection, including, but not limited to, desktop computers, laptop computers, cellular phones, personal digital assistants (PDAs), or any combination of the aforementioned devices. The network (115) may be either a wired network or a wireless network, or a combination of both.

The instant messaging exchange may take place using an instant messaging client. Many such instant messaging clients exist as individual applications or in-browser clients, for example. Instant messaging is an increasingly popular and widely used method of communicating between two remote points on a network. Instant messaging is a form of text-based communication that allows users to communicate through a low attention, low commitment exchange. Modern instant messaging systems allow for a variety of multimedia connections to be established between messaging devices in which users can either hear or see each other through audio or video connections. These connections are generally created when a first user sends a request to a second user to initiate a multimedia connection and the second user accepts the request. Additionally, such connections may require a higher level of attention and commitment than simple text-based conversations. Because of the attention and commitment required, users may be hesitant to engage in such exchanges.

The system of the present specification allows multimedia content such as audio and video to be sent between users without requiring the attention and commitment that the multimedia connections typically included in other instant messaging clients. Accordingly, a first user at the first messaging device (105) may engage in an instant messaging exchange with a second user at the second messaging device (110). While the present description refers principally to first and second messaging devices (105, 110), the instant messaging exchange may also include more than two users/devices in a group exchange.

During the exchange, a first user involved in the exchange may desire to send video or audio to a second user in the exchange. Rather than establishing a real-time multimedia connection with the second user, the first user is able to record the multimedia content at the first messaging device (105) and send it to the second messaging device (110) as part of the instant messaging exchange. When the multimedia content has been transmitted to the second messaging device (110), the multimedia content may be played back at the second messaging device (110) for the second user. In this manner, the first user is able to record audio or video and send it to the second user without the need to set up an actual video or audio connection. The ability to send video or audio without committing to a direct speech or video based conversation may be preferred at times when the users do not have time to devote much or all of their attention to a potentially complex or involved conversation. Sending user-generated multimedia content in this manner also provides a method for the users to explain elements of the conversation more effectively than through text exchange only.

Figure 2:
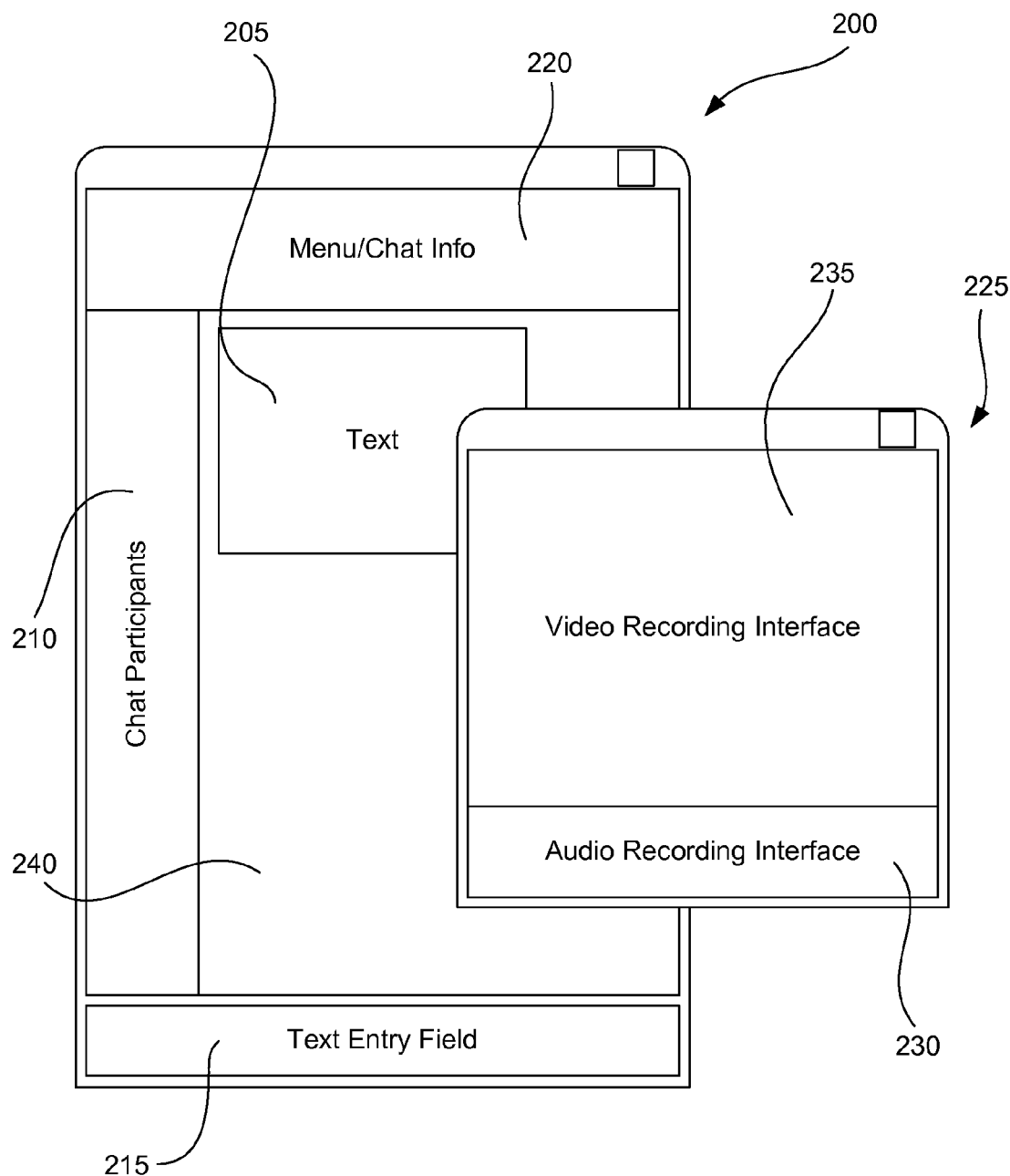
FIG. 2 is a diagram of an illustrative system for incorporating user-generated multimedia content in an instant messaging exchange, according to one exemplary embodiment of principles described herein.

With reference now to FIG. 2, an illustrative system for incorporating user-generated multimedia content in an instant messaging exchange is shown. The instant messaging exchange may take place on an instant messaging client (200). As with may typical instant messaging clients, the client (200) shows the text (205) exchange between the users involved in the conversation in the chat transcript (240), as well as which user entered each text entry. The client (200) may also list all of the users or chat participants (210) that are presently participating in the chat. The client (200) also includes a text entry field (215) where users may input text to be submitted to the conversation, as shown at the bottom of the client (200) in FIG. 2. The client (200) may also include other chat information, as well as a menu (220) or toolbar.

The menu (220) may have options that allow the user to customize various visual aspects of the client (200) interface, for example customizing the font size, style, and color of the text during the chat, or customizing which information is displayed in the client interface. In addition to customizing options, the menu (220) may also include an option to open a recording interface (225) in order to record user-generated multimedia content for submitting to the chat. Alternatively, the recording interface (225) may be part of the original client interface and may have buttons that allow the user to record multimedia content without opening a separate recording interface window.

Using the recording interface (225), the user may have the option to record different types of multimedia, such as audio, video, or both. The recording interface (225) may be divided according to the type of multimedia that the user desires to record, as shown. If the user desires to record audio, the user clicks a record button in the audio recorder (230). If the user desires to record video, the user clicks a record button in the video recorder (235). The video recorder (235) may also record audio simultaneously with the video. The user may need multimedia input devices connected to or built into the messaging device in order to record user-generated multimedia content, such as a microphone and/or a camera.

When the user clicks the record button in the recording interface (225), the specified input device is activated and begins recording. The recording interface (225) may display feedback to indicate that the input device is operating correctly. For example, the video recorder (235) may display the video that is being recorded by the camera. The audio recorder (230) may display a frequency response of the audio input. The recording interface (225) may also allow the user to play back the multimedia that has been recorded in order to verify that the recording includes the correct content and that no errors occurred during the recording. After recording the multimedia content, the user may click a submit button on the recording interface (225) to submit the content to the instant messaging exchange. According to another embodiment of the chat client, the multimedia content is sent automatically when the user presses a stop button.

Figure 3:
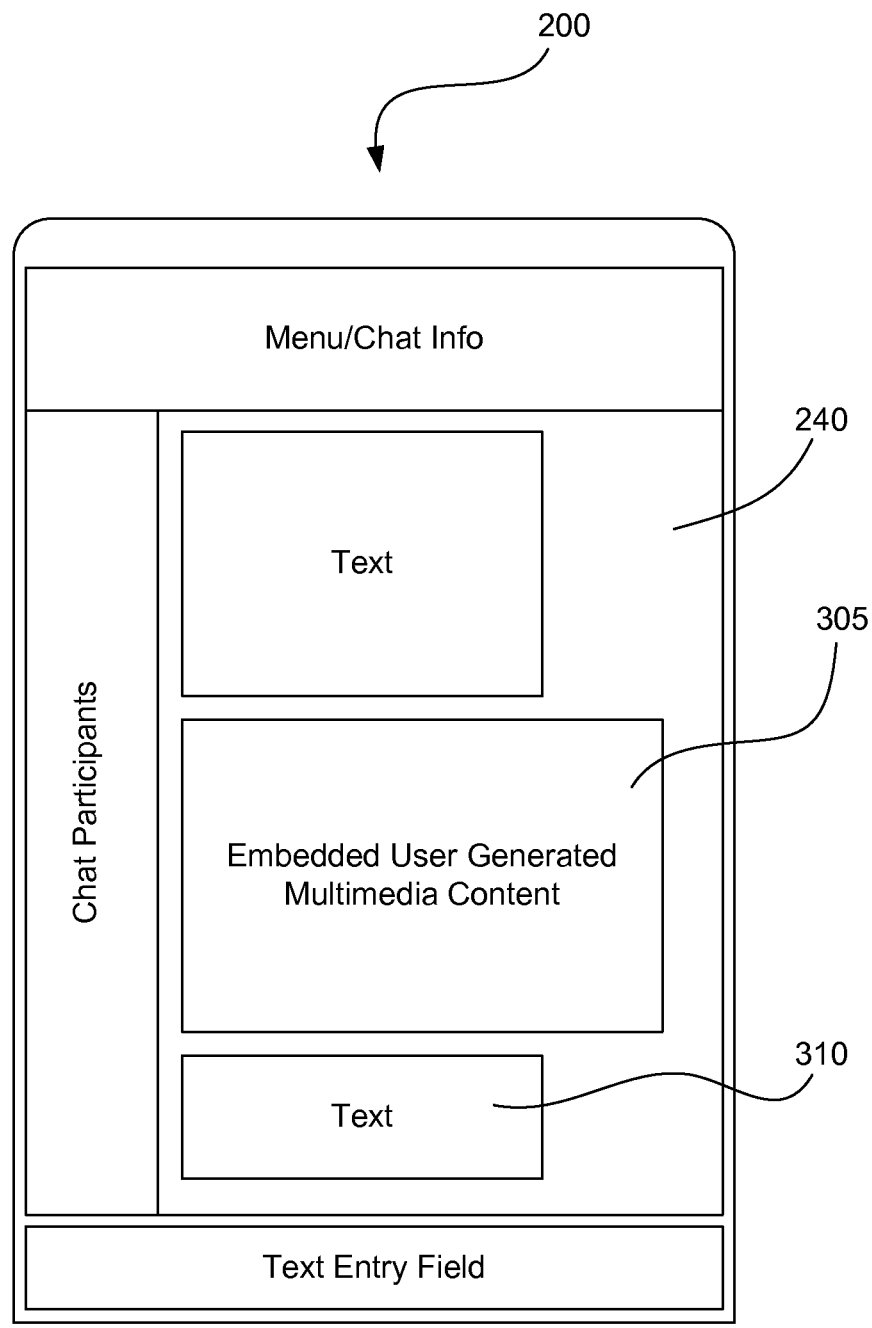
FIG. 3 is a diagram of an illustrative system for incorporating user-generated multimedia content in an instant messaging exchange, according to one exemplary embodiment of principles described herein.

With reference now to FIG. 3, another illustrative embodiment of a system for incorporating user-generated multimedia content into an instant messaging exchange is shown. After submission, the multimedia content (305) is published or embedded in-line in the chat transcript (240) with the text of the chat transcript so that all participants of the chat may see the content in the client (200).

The multimedia content (305) is embedded in the chat transcript (240) chronologically, so that the users may see when the multimedia content (305) was entered, which may help in understanding the context of the multimedia content (305), particularly if a user desires to view the exchange at a later time. The entire content of the instant messaging exchange may be saved for later viewing after the client interface or chat window has been closed. Multimedia content (305) embedded in the chat transcript (240) may be stored with the transcript of the text, or the content (305) may be stored in a separate folder such that the users may look at all of the multimedia content (305) that has been exchanged. In embodiments where the multimedia content (305) is stored in a separate folder, the transcript may contain a link to the multimedia content (305) such that the content is still in-line with the text for viewing by a user. The stored multimedia content (305) may also be stored in folders according to date or instant messaging exchange, according to the desired organization. This ability to go back and view the multimedia content (305) at a later time provides an advantage over real-time video and audio connections that are present in instant messaging clients of the prior art, which typically do not provide a way for the multimedia exchange to be recorded.

After the multimedia content (305) is embedded in the chat transcript (240), the conversation may continue with additional text (310) following the multimedia content (305) in the transcript (240). Additional multimedia content may be added such that the chat transcript (240) may contain several instances of multimedia content. Consequently, it is possible that a majority of an instant messaging exchange may be user-generated multimedia content that has been exchanged between the chat participants (210, FIG. 2). The multimedia content (305) may be useful for explaining concepts that would be more difficult to explain through text, and therefore may reduce the length of the chat transcript (240), making navigation through the transcript (240) easier.

Figure 4:
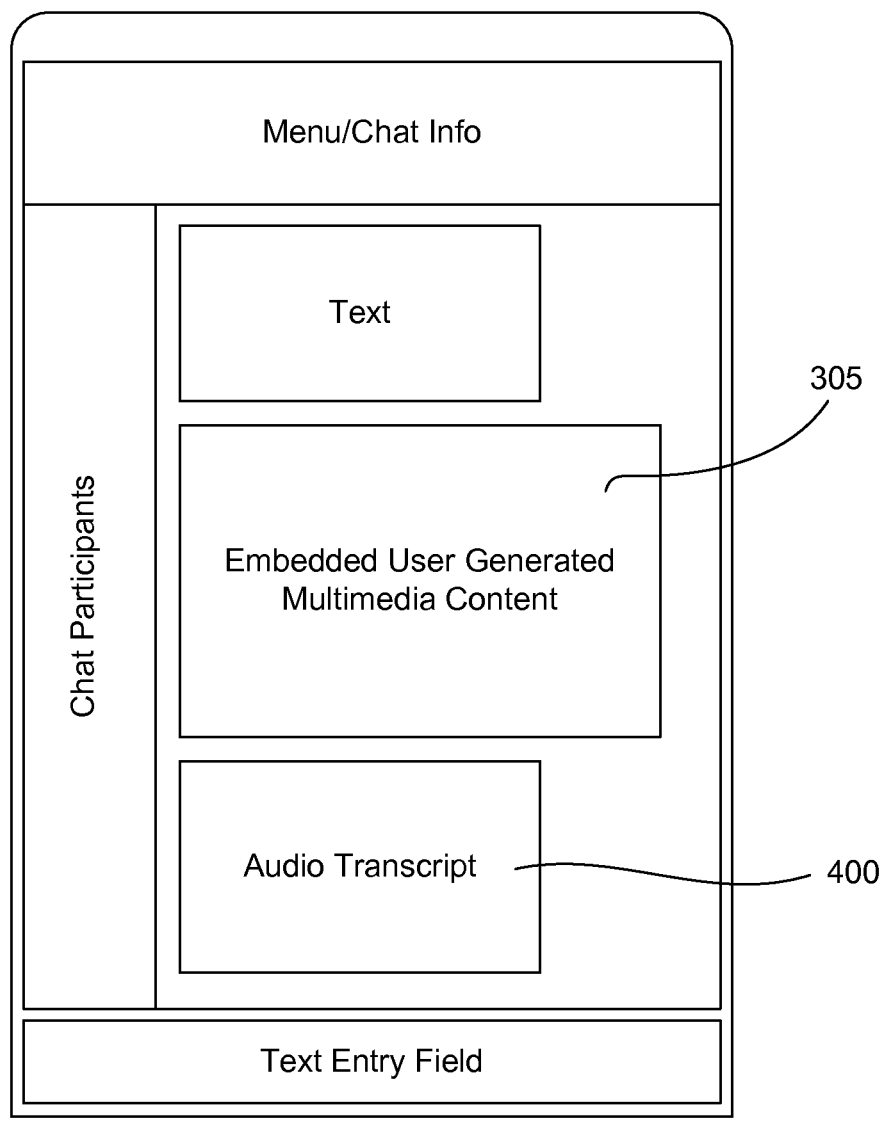
FIG. 4 is a diagram of an illustrative system for incorporating user-generated multimedia content in an instant messaging exchange, according to one exemplary embodiment of principles described herein.

With reference now to FIG. 4, another illustrative embodiment of a system for incorporating user-generated multimedia content into an instant messaging exchange is shown. According to some embodiments, the user-generated multimedia content (305) may be replaced or succeeded by a transcript (400) of the audio portion of the recording. The audio transcript (400) may be created by a speech-to-text conversion process after the content (305) is recorded. The audio transcript (400) may be attached to the multimedia content (305) when the multimedia content (305) is embedded in the chat transcript (240). Either the audio transcript file or the multimedia content file, or both, may include a tag linking to the other. For example, the tag may include key words relating to the multimedia content (305), or it may contain the title name of the multimedia content (305). By linking the files together, the files may be found simultaneously when the user searches for the multimedia content (305).

An audio transcript (400) of the multimedia content (305) may also be created by the user who creates the multimedia content (305). Doing so may take more time than a speech-to-text conversion process, but it may also allow the user to highlight the most important aspects of the multimedia content (305) by creating a simple outline of the content. This may be particularly helpful when referring back to the transcript to find the most important details of the exchange. The manually created audio transcript (400) may be sent in addition to an automatically generated audio transcript (400) so that the most important aspects as well as the finer details of the exchange may both be found relatively easily.

According to another embodiment, the instant messaging exchange may be configured to send the user-generated multimedia content (305) in several different files or sections. This may be useful with slower connections or with very long recordings, so that the user receiving the multimedia content (305) is able to see portions of the content before all of the content is completely finished downloading. In other embodiments, the multimedia content (305) may be played back through an established streaming channel. The streaming channel may be established when the chat connection is first established, when the user first begins recording the multimedia content (305), or when the user finishes recording the multimedia content (305). The streaming channel may also be setup to play the multimedia content (305) in real-time as the content is downloaded, or on a buffered delay. The instant messaging client may provide options for changing the properties of the recording or the playback, including playback size and quality.

Figure 5:
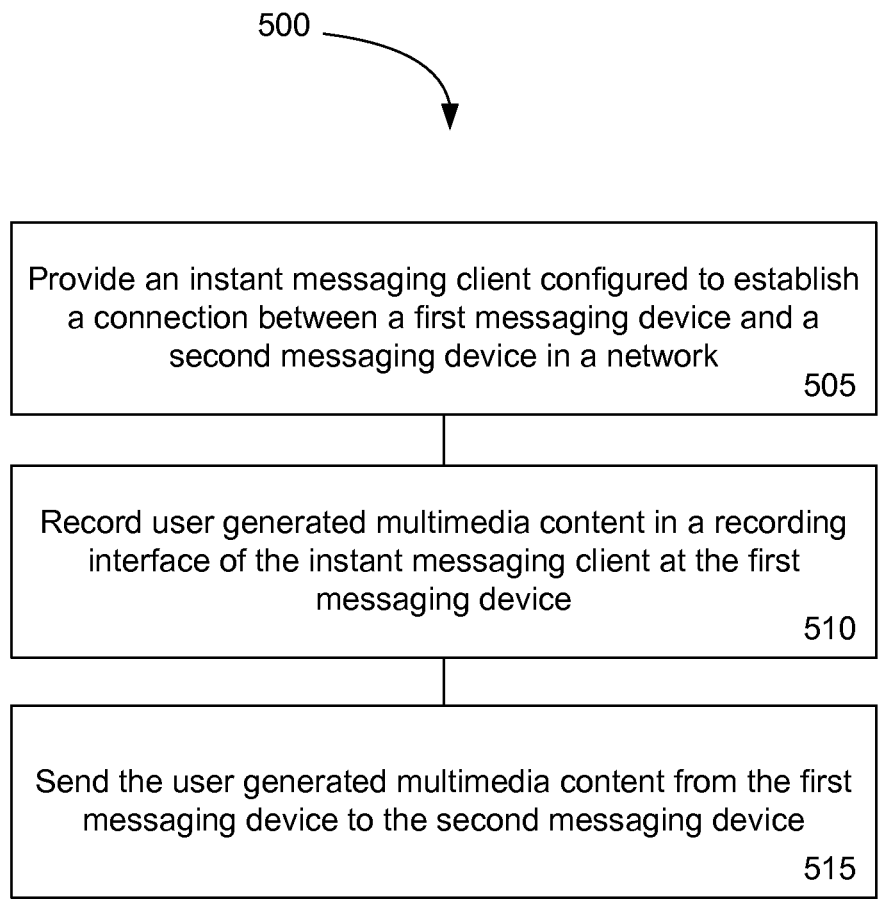
FIG. 5 is a flowchart showing an illustrative method of incorporating user-generated multimedia content in an instant messaging exchange over a network, according to one exemplary embodiment of principles described herein.

Referring now to FIG. 5, a flowchart showing an illustrative method (500) for incorporating user-generated multimedia content in an instant messaging exchange is shown. The method (500) includes providing (505) an instant messaging client configured to establish a connection between a first messaging device (105, FIG. 1) and a second messaging device (110, FIG. 1) in a network (115, FIG. 1). As previously mentioned, the instant messaging client (200, FIG. 2) may be a stand-alone program for use with an operating system, or the client may be an in-browser client for use in a particular website, for example. When the connection has been established the users at each of the messaging devices may engage in a real-time conversation through the use of the client.

The method further includes recording (510) user-generated multimedia content in a recording interface (225, FIG. 2) of the instant messaging client at the first messaging device. The recording interface may be part of the original client interface window, or the recording interface may be opened in a separate window. The user-generated multimedia content may be any multimedia content, including video and audio, produced by the user, rather than by a third party.

After recording the user-generated multimedia content, the first messaging device sends (515) the content to the second messaging device. The multimedia content (305, FIG. 3) is displayed in the client on both messaging devices and may be in chronological order of entry with the rest of the text of the conversation.

The multimedia content may be played in the client either automatically upon receipt or upon request by the user. The client may have playback options which allow the users to determine how the content is played, for example, whether the content is played automatically or upon request, or whether the content is streamed or downloaded before playing, among other options. Playback may also be based on at least one policy rule. Such a policy rule may depend on one or more factors, including, but not limited to, the identity of the remote user (user at the second messaging device), location of the users, time of day, and ambient noise measurements. For example, if the ambient noise measurements at one or both of the messaging devices are too loud, the automatic playback may not be effective if the output sound level of the multimedia content is not sufficiently loud so as to be heard over the ambient noise.

The instant messaging client may apprise the first user of the existence and status of any policy rules which may be in effect at each of the messaging devices. This may help the first user to avoid recording something that should not be played automatically, such as sensitive information that should not be played back in a public area. The second user may also be at a messaging device attached to a public network, rather than a private network, which may also adversely compromise the privacy of the conversation. Consequently, if the policy rule defines that the content not be automatically played over a public network, the second user may need to request that the content be played back by pressing a play button or similar request. According to one embodiment, the first user may be able to override the policy rule. The override may be a manual override accomplished by setting a flag that dictates whether or not certain content should be played automatically. Alternatively, the override may be due to another policy rule or meta policy rule based on a broad set of policies.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for displaying multimedia content created by a user of a first computerized messaging device to a user of a second computerized messaging device communicatively coupled to said first computerized messaging device by a network, said method comprising;
   displaying, with said second computerized messaging device, a textual instant messaging exchange between said user of said first computerized messaging device and said user of said second computerized messaging device;
   transmitting an automatic playback policy rule of said second computerized messaging device to said first computerized messaging device;
   receiving said multimedia content at said second computerized messaging device over said network;
   dynamically embedding a player for said multimedia content in-line in said display of said textual instant messaging exchange at said second messaging device; and
   apprising said user of said first computerized messaging device of said automatic playback policy rule prior to receiving said multimedia content at said second computerized messaging device; and
   automatically playing said multimedia content in said player responsive to a determination that the automatic playback policy rule has been met and that an instruction to override said automatic playback policy rule has not been received from said first computerized messaging device.

2. The method of claim 1, further comprising playing said multimedia content at said second computerized messaging device responsive to input received from said user of said second computerized messaging device.

3. The method of claim 1, in which said policy rule is dependent upon at least one of: a location of said second computerized messaging device, an identity of said user of said first computerized messaging device, an identity of said user of said second computerized messaging device, a time of day at said location of said second computerized messaging device, and ambient noise measurements at said location of said second computerized messaging device.

4. The method of claim 1, in which receiving said multimedia content at said second computerized messaging device over said network comprises receiving a streaming transmission said user-generated multimedia content on an established streaming channel.

5. The method of claim 4, in which said streaming channel is established while establishing a connection between a first messaging device and a second messaging device for said textual instant messaging exchange.

6. The method of claim 4, in which said streaming channel is dynamically established immediately prior to said receiving said multimedia content at said second computerized messaging device over said network.

7. The method of claim 1, further comprising displaying a transcript of an audio portion of said user-generated multimedia content in said display of said textual instant messaging exchange at said second computerized messaging device.

8. The method of claim 1, further comprising storing a transcript of said textual instant messaging exchange with said second computerized messaging device, said transcript comprising said dynamically embedded player of said user-generated multimedia content.

9. An instant messaging system, comprising:
   a computerized messaging device comprising a processor and memory communicatively coupled to said processor, said computerized messaging device being configured to:
   exchange textual instant messages with a remote device over a network and display said textual instant messages to a user;
   transmit an automatic playback policy rule of said computerized messaging device to said remote device over said network;
   receive multimedia content from said remote device, said multimedia content being related to said textual instant message exchange;
   dynamically embed a player for said multimedia content in-line in said display of said textual instant messages to said user; and
   apprise said user of said computerized messaging device of said automatic playback policy rule prior to receiving said multimedia content at said remote device; and
   automatically play said multimedia content in said player responsive to a determination that said automatic playback policy rule has been met and that an instruction to override said automatic playback policy rule has not been received from said remote device.

10. The system of claim 9, in which said computerized messaging device is further configured to play said multimedia content with said player responsive to input received from said user.

11. The system of claim 9, in which said policy rule condition is dependent upon at least one: a location of said computerized messaging device, an identity of said user, a time of day at said location of said computerized messaging device, and ambient noise measurements at said location of said computerized messaging device.

12. The system of claim 9, in which said computerized messaging device is further configured to establish a streaming channel said network between said computerized messaging device and said remote device and to receive said multimedia content from said remote device over said streaming channel.

13. The system of claim 12, in which said computerized messaging device is further configured to establish said streaming channel while establishing a connection with said remote device for said textual instant messaging exchange.

14. The system of claim 12, in which said computerized messaging device is further configured to dynamically establish said streaming channel immediately prior to receiving said multimedia content from said remote device.

15. The system of claim 9, in which said computerized messaging device is further configured to display a transcript of an audio portion of said user-generated multimedia content in said display of said textual instant messages to said user.

16. The system of claim 9, in which said computerized messaging device is further configured to store a transcript of said textual instant messaging exchange, said transcript comprising said dynamically embedded player of said user-generated multimedia content.

17. A computer program product for incorporating user-generated multimedia content in an instant message exchange, the computer program product, comprising:
   a computer readable storage device having computer readable program code embodied therewith, the computer readable program code comprising:
   computer readable program code configured to, when executed by a processor, exchange textual instant messages with a remote device over a network and display said textual instant messages to a user;

computer readable program code configured to, when executed by a processor, transmit an automatic playback policy rule of said second a computerized messaging device to said remote device over said network;

computer readable program code configured to, when executed by a processor, receive multimedia content from said remote device, said multimedia content being related to said textual instant message exchange;

computer readable program code configured to, when executed by a processor, dynamically embed a player for said multimedia content in-line in said display of said textual instant messages to said user;

computer readable program code to, when executed by a processor, apprise said user of said computerized messaging device of said automatic playback policy rule prior to receiving said multimedia content at said remote device;

computer readable program code configured to, when executed by a processor, determine whether an instruction has been received from said remote device to override the automatic playback policy rule implemented by said second computerized messaging device for playback of said multimedia content; and computer readable program code configured to, when executed by a processor, automatically play said multimedia content in said player responsive to a determination that said automatic playback policy rule has been met and that an instruction to override said automatic playback policy rule has not been received from said remote device.

* * * * *